Patented July 8, 1930

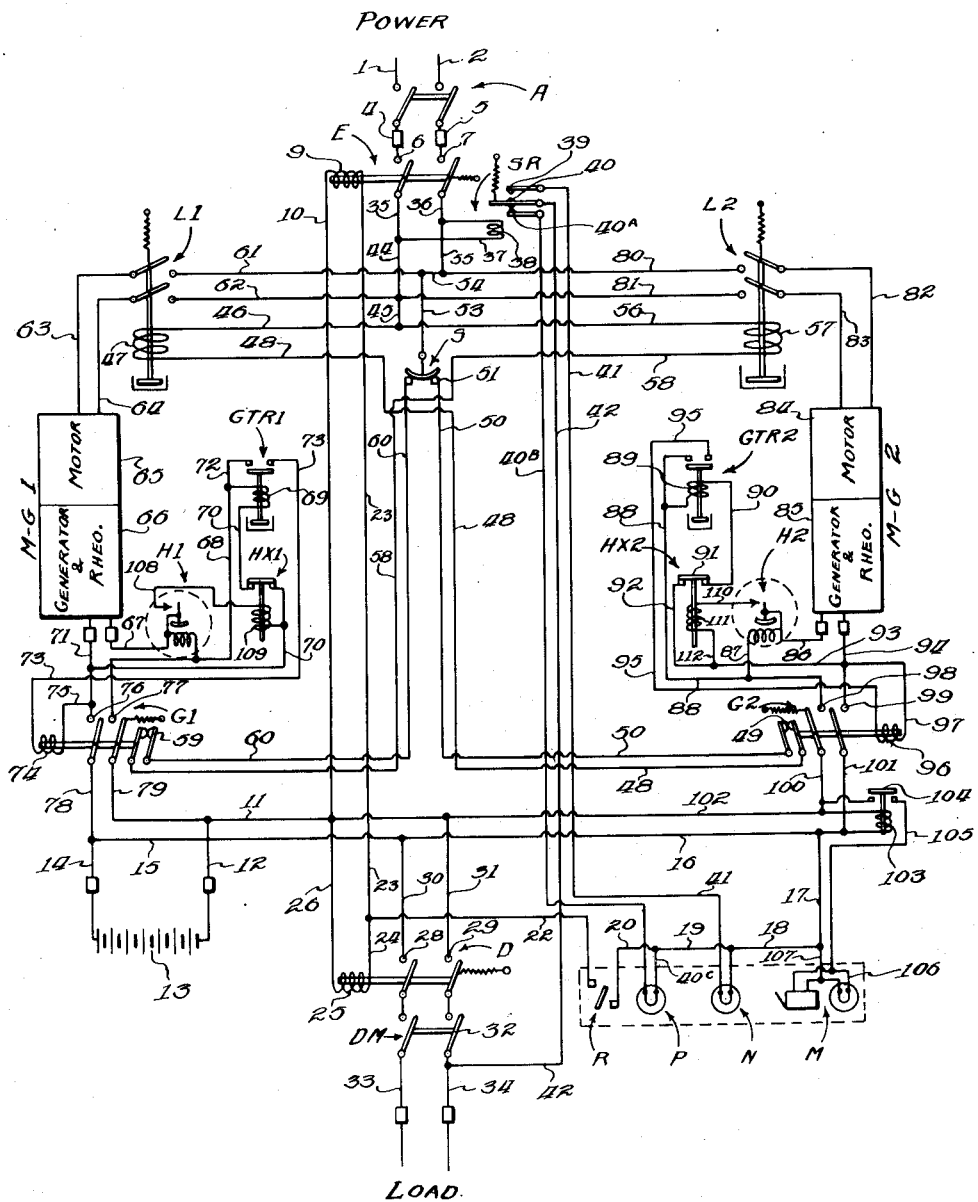

1,770,055

UNITED STATES PATENT OFFICE

RALPH T. WILLIAMS, OF CHICAGO, ILLINOIS, ASSIGNOR TO ROTH BROTHERS & CO., OF CHICAGO, ILLINOIS, A CORPORATION OF ILLINOIS

EXIT AND EMERGENCY LIGHTING SYSTEM

Application filed June 4, 1928. Serial No. 282,783.

This invention relates to emergency exit lighting systems for use in theatres and the like where it is essential that no circumstance can arise that shall cause the exit lights to fail. The main objects of this invention are to provide an exit lighting system having two independent motor-generator sets, arranged so that if either fails, the other will automatically pick up the load, and having a battery which picks up the load in case both generator sets fail; to provide a system of this kind wherein the exit lights may be operated at low voltage compared with that of the main lighting system and whereby the exit lighting ultimate source of power may be normally the same as that of the main lighting system, namely, except when the exit lighting circuit is operated on a battery, but whereby the exit lighting power supply will be safeguarded by duplicate generators supplementing each other and supplemented by a storage battery capable of carrying the load over such period of time as will permit trouble to be corrected or repairs to be made to the motor generator sets while the exit lights are in operation; and to provide an adequate remote control and signal system for indication of operating conditions.

An illustrative embodiment of this invention is shown in the accompanying drawing in which the figure is a circuit diagram of the complete system. In the system shown in the drawings, a power source circuit comprising lead wires 1 and 2 is connected to any suitable main source of power, usually direct current, which may be of commercial voltage, as for example 230 volts, and which may supply the main lighting load of the building. A manually operable power service switch A is provided to establish connection with the exit lighting system or emergency load. This switch A connects the leads 1 and 2 through fuse boxes 4 and 5 respectively, to switch contacts 6 and 7 respectively, of a normally open switch E which is adapted to be closed on the contacts 6 and 7 by the energizing of a relay coil 9.

One side of the relay coil 9 is connected through lead wires 10, 11 and 12 to a battery 13. The opposite side of the battery 13 is connected by lead wires 14, 15, 16, 17, 18, 19 and 20 to a manually operable control switch R which may be located at a convenient place in the theatre lobby or control room.

When the control switch R is closed, the circuit is completed through lead wires 22 and 23 to the opposite side of the relay coil 9, thus energizing said coil and closing the switch E.

When the control switch R is closed, a circuit is also completed through the lead wires 22 and 24 through a relay coil 25, lead wires 26, 11, 12, battery 13 and lead wires 14 to 20 inclusive to the switch R. The energizing of the coil 25 closes a normally open switch D onto switch contacts 28 and 29 which are connected by lead wires 30 and 31 respectively to the opposite side of the battery 13 through the lead wires 15 and 14 and 11 and 12 respectively. Closing of the switch D completes the circuit through a manually operable switch 32, when closed, to the lead wires 33 and 34 which carry the current to the exit or emergency lights of the building.

When the control switch R is closed, the relay coils 9 and 25 are energized by current from the battery 13 causing the switches E and D respectively to close. If no electromotive force is connected to the power leads 1 and 2, the relay coil 38 is not energized and the switch SR remains closed, thus completing a circuit through the switch contact 40, contact 40A, and lead 40B to a signal light P and thence through lead 40C and leads 19 to 14 inclusive to the battery 13 and through leads 12, 11, 31, switches D and 32 and lead 42. A visual signal is thus provided to show that the system is operating from the battery only. However, as soon as a normal voltage is supplied to the leads 1 and 2, the coil 38 will be energized and the circuit closed through the contacts 39 and 40 at the same time opening the circuit through the contacts 40 and 40—A.

Closing of the switch E permits current to pass to lead wires 35 and 36 upon which is bridged a relay circuit 37 to energize a relay 38. Energizing of the relay 38 actuates a switch SR to close a circuit through switch contacts 39 and 40—A connected to lead wires 42 and 40B respectively. Lead wire 40—B passes through a signal lamp P whose circuit is completed through the wires 40—C, 10, 18, 17, 16, 15 and 14 through the battery 13, thence through wires 12, 11, 31, switch contact 29, switch D, switch 32 to the lead wire 42.

Current passing from lead 1 and switches A and E through the lead 35 also energizes an auxiliary circuit comprising leads 44, 45 and 46 to one side of dashpot relay coil 47. The opposite side of relay 47 is connected through lead 48, normally closed auxiliary switch contacts 49, lead 50, switch contact 51, switch S, leads 53, 54 and 55, back to the incoming lead 36 on the opposite side of the circuit.

A similar auxiliary circuit is also completed through the leads 35, 44 and 45 through a lead 56, dashpot relay coil 57, lead 58, normally closed auxiliary switch contacts 59 and lead 60 to switch S and thence through leads 53, 54 and 55 as before.

Energizing of the relay coils 47 and 57 close line switches L—1 and L—2 respectively. These switches are provided with dashpots which are so adjusted and regulated that the switch L—1 will close in advance of the switch L—2.

Closing of the switch L—1 permits current from lead wires 61 and 62 which are connected to the incoming leads 35 and 36 to pass through switch L—1 and leads 63 and 64 to a motor 65 of a combination motor-generator set designated 1st M—G set on the drawings. Generator 66 connected to the motor 65 will now start to build up a current output which passes through lead wires 67, reverse current meter H—1, lead 68, relay coil 69, lead 70, normally closed switch HX—1, leads 70 and 71, which completes the circuit back to the generator.

Energizing of the coil 69 closes a dashpot controlled switch GTR—1, the closing of which completes a circuit through the leads 68, 72, 73, relay coil 74, lead 75 back to the lead 71 on the other side of the circuit. Energizing of the relay coil 74 closes a normally open generator line switch G—1 on switch contacts 76 and 77, thus permitting current from the generator to flow through the switch G—1 to lead wires 78 and 79, which lead to opposite sides of the battery 13 and also to the leads 30 and 31, thence through the switch D to the emergency lights, through the leads 33 and 34. Closing of the switch G—1 opens the switch contacts 59, thus opening the circuit through the relay coil 57, thereby opening the line switch L—2.

At the time relay coil 47 is energized, the relay coil 57 is also energized, thus closing the line switch L—2 but at a short time interval later owing to difference in dashpot adjustment as above indicated. Closing of the switch L—2 permits current from the power leads 35 and 36 to pass through leads 80 and 81, switch L—2 and leads 82 and 83 to the motor 84 of a motor-generator set designated 2nd M—G set on the drawings.

Operation of the motor 84 causes the generator 85 connected thereto to build up a current output which passes out through the lead 86, reverse current meter H—2, leads 87 and 88, relay coil 89, lead 90, normally closed switch 91, leads 92, 93 and 94 back to the other side of the generator, or at least normally such action is to some extent started before switch L—2 is caused to open by the leading generator 66.

Energizing of the relay coil 89 closes a dashpot controlled switch GTR—2, if it be given sufficient time, thus completing a circuit through the lead 88, 95, relay coil 96, lead 97, back to the generator lead 94. Closing of this circuit energizes coil 96 which closes a generator line switch G—2 on to switch contacts 98 and 99, current thereby passing through the switch G—2, leads 100 and 101 to the leads 102 and 16 respectively, which are connected to the lead 31 and 30 respectively, of the emergency lighting system.

Closing of the switch G—2 opens the normally closed switch contacts 49, thereby de-energizing the relay coil 47 and causing the line switch L—1 to open.

As shown at the lower right of the circuit diagram, a relay coil 103 is bridged onto the leads 102 and 16. This coil normally holds open a switch 104 which, when closed, completes a circuit through leads 102 105 and 106 to a signal lamp and alarm set M, return circuit being made through the leads 107, 17 and 16 to battery 13.

The switch S through which current is supplied from the lead 53 to both leads 50 and 60 is arranged to be manually operated so as to complete the circuit through either of the leads 50 or 60 separately or through both leads at the same time.

The reverse current meter H—1 of the first motor generator set is arranged so that when the current is reversed therethrough, it will connect the lead 67 with a lead 108 which passes through a relay coil 109 and thence to lead 70. Energizing of the coil 109 opens the normally closed switch HX—1, which de-energizes coil 69 and so opens switch GTR—1 for breaking the circuit through the relay coil 74 so as to open the generator line switch G—1.

In the same manner, the reverse current meter H—2 of the second generator set is arranged so that when the current is reversed therethrough, it will close a circuit through leads 86 and 110, through relay coil 111 and leads 112 and 93 back to the lead 94 on the other side of the generator. Energizing of the coil 111 opens the switch HX—2 thereby de-energizing coil 89 and opening switch GTR—2, and so breaking the circuit through the relay coil 96 and opening the generator line switch G—2.

Briefly the operation of this system is as follows: The power service switch 32, which is also designated A and load switch DM, are closed to connect the system with those circuits and bring under control of remote control switch R.

When the control switch R is closed, current from battery 13 will energize relay coils 9 and 25, closing the switches E and D, thus permitting current from the power source leads 1 and 2, to energize the relay coils 47 and 57 for closing the motor starting switch L—1 and L—2 of both motor-generator sets MG1 and MG2, but the dashpot adjustment on these switches is so timed that the switch L—1 closes in advance of the switch L—2. The motor-generators both come up to speed and their generators build up voltage. If the first motor generator set (MG1) is functioning properly and the timing adjustments have been properly made, it will build up its potential first.

Current from the first generator 66 energizes the circuit of relay coil 69, thus causing the switch GTR—1 to close, completing the circuit through the relay coil 74 and closing the generator line switch G—1 and opening the auxiliary switch contacts 59 thereby breaking the circuit through the relay coil 57 and permitting the switch L—2 to open and stop the second motor-generator set MG—2.

The switch GTR—1 is also dashpot controlled so as to act in advance of the similar switch GTR—2 of M—G—2 set. This in ultimate general effect supplements the retarding effect of the dashpots on the switches L—1 and L—2. In this manner, the switch G—1 is closed and the switch L—2 opened before the switch G—2 of the second motor generator set is closed and this occurs even if switch L—1 or L—2 be slightly mistimed.

In case the first generator set fails for any reason or if its voltage falls below the floating voltage of the battery 13, a reverse current passing through the reverse current meter H—1 will close the circuit through the relay coil 109 and thus open the normally closed switch HX1. Opening of this switch deenergizes relay 69, opens switch GTR—1, deenergizes relay coil 74, thus causing the generator line switch G—1 to open and the contacts 59 to close.

Closing of the auxiliary contact 59 causes the relay coil 57 to close the line switch L—2 and start the second motor generator set. The control and operation of the second motor-generator set MG—2 are identical with those of set MG—1 except that the dashpot timing relays delay the second set and cause the first to normally assume the load if it is in condition to do so. If the first set is not in such condition, it is automatically cut out by the functioning of the second set.

In case the second set MG—2 fails or its current output falls below that of the battery output 13, it will likewise be disconnected from the load and from the power source by the action of its reverse current meter H—2 which will open the generator line switch G—2.

With both the switches G—1 and G—2, the battery 13 will continue to supply current to the emergency lights through the leads 33 and 34.

If the voltage of the battery falls below a predetermined point, as from failure of machines MG—1 and MG—2 to keep it charged, the normally open switch 104 closes the alarm circuit through the leads 105, 106 and 107 which may be wired to a suitable alarm signal light and buzzer M.

If it is desired to start the second motor generator set MG—2 first, the switch S is turned so as to make contact only with the terminal of lead 60, thereby completing the circuit through the relay coil 57 which will close the line switch L—2. After the second motor generator set has gotten up to speed and the generator line switch G—2 closed, the switch S is then turned back so as to contact with the terminals of both leads 50 and 60 so that thereafter if the second motor generator set fails, the first motor generator set MG—1 will pick up the load.

The signal system operates as follows:

As long as switches A and E are closed and the power source is "on" either motor generator set is operating, the service relay coil 38 will hold switch SR with contact 40 closed on contact 40A and current from the generator will light signal lamp P. If the main power service fails, then relay 38 will release switch arm 40 which is normally urged away from contact 40A and allow it to close on contact 39 and illuminate signal light N. Since conductor 42 is connected to one of the emergency exit load leads beyond the switches D and 32, the lights P and N indicate that the emergency lights are operating normally from the power of the motor generator sets or the battery respectively. If the current output of the battery falls below a certain point relay 103 will fail to hold switch 104 open and will thus operate alarm signal M.

Although but one specific embodiment of this invention has been herein shown and described, it will be understood that details of the construction shown may be altered or omitted without departing from the spirit of this invention as defined by the following claims.

I claim:

1. In a lighting system of the class described, the combination of a power supply circuit, a pair of motor generator sets each having a motor line circuit connected with said power circuit, normally open individual line switches for said motor circuits, individual relays and relay circuits for closing said motor line switches, individual generator line circuits for said motor generator sets, normally open generator switches in said generator line circuits, normally closed auxiliary switches each associated with the generator line switch of one motor generator set and connected in the relay circuit of the motor line switch of the other motor generator set, a relay energized by its respective generator circuit for simultaneously closing said generator line switch and opening the associated auxiliary switch controlling the motor line switch of the other motor generator set.

2. In a lighting system of the class described, the combination of a power supply circuit, a pair of motor generator sets each having a motor line circuit connected with said power circuit, normally open individual line switches for said motor circuits, individual relays and relay circuits for closing said motor line switches, individual generator line circuits for said motor generator sets, normally open generator switches in said generator line circuits, normally closed auxiliary switches each associated with the generator line switch of one motor generator set and connected in the relay circuit of the motor line switch of the other motor generator set, a relay energized by its respective generator circuit for simultaneously closing said generator line switch and opening the associated auxiliary switch controlling the motor line switch of the other motor generator set, and a generator timing relay switch for timing the action of said generator line switch relay.

Signed at Chicago this 31st day of May, 1928.

RALPH T. WILLIAMS.

CERTIFICATE OF CORRECTION.

Patent No. 1,770,055.  Granted July 8, 1930, to

RALPH T. WILLIAMS.

It is hereby certified that error appears in the printed specification of the above numbered patent requiring correction as follows: Page 3, line 5, strike out the words "A and load switch" and insert the same to follow "switch" in line 4; same page, line 75, after "G-2" and before the comma insert the word open; and that the said Letters Patent should be read with these corrections therein that the same may conform to the record of the case in the Patent Office.

Signed and sealed this 2nd day of September, A. D. 1930.

(Seal)

M. J. Moore,
Acting Commissioner of Patents.